United States Patent
Watanabe (10) Patent No.: US 9,654,166 B2
(45) Date of Patent: May 16, 2017

(54) ELECTRONIC DEVICE INCLUDING REINFORCEMENT FORMED AT EDGE OF HOUSING AND WIRELESS COMMUNICATION APPARATUS INCLUDING REINFORCEMENT FORMED AT EDGE OF HOUSING

(71) Applicant: FUJITSU LIMITED, Kawasaki-shi, Kanagawa (JP)

(72) Inventor: Yasuaki Watanabe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/215,880

(22) Filed: Jul. 21, 2016

(65) Prior Publication Data
US 2017/0033825 A1    Feb. 2, 2017

(30) Foreign Application Priority Data
Jul. 30, 2015    (JP) ................. 2015-150565

(51) Int. Cl.
H04B 1/38    (2015.01)
H04M 1/02    (2006.01)
H04B 1/3888    (2015.01)

(52) U.S. Cl.
CPC .......... *H04B 1/3888* (2013.01); *H04M 1/026* (2013.01); *H04M 1/0249* (2013.01)

(58) Field of Classification Search
CPC ............................ H04B 1/3888; H04M 1/0249
See application file for complete search history.

(56) References Cited

U.S. PATENT DOCUMENTS

| | | | |
|---|---|---|---|
| 7,764,936 B2* | 7/2010 | Nakasono | G07C 9/00944 200/302.2 |
| 9,432,074 B2* | 8/2016 | Fathollahi | H04B 1/3888 |
| 9,527,645 B2* | 12/2016 | Chao | B65D 81/02 |
| 2014/0073377 A1* | 3/2014 | Chang | H04B 1/3888 455/575.8 |
| 2014/0087792 A1* | 3/2014 | Park | H05K 5/061 455/575.1 |
| 2015/0171913 A1* | 6/2015 | Rayner | G06F 1/1656 455/575.8 |
| 2016/0072932 A1* | 3/2016 | Hill | H04M 1/0249 455/575.1 |
| 2016/0192751 A1* | 7/2016 | Corcoran | A45C 11/00 224/245 |
| 2016/0234356 A1* | 8/2016 | Thomas | H04B 1/3888 |
| 2016/0352381 A1* | 12/2016 | Yamaguchi | H04M 1/026 |

FOREIGN PATENT DOCUMENTS

| | | |
|---|---|---|
| JP | 2000-278376 | 10/2000 |
| JP | 2010-87022 | 4/2010 |

\* cited by examiner

*Primary Examiner* — Blane Jackson
(74) *Attorney, Agent, or Firm* — Fujitsu Patent Center (57) ABSTRACT

An electronic device includes: a frame forming an edge portion of a plate-like housing; a groove defining a hollow, along an edge of the housing, in the frame; and a reinforcement disposed in the frame and made of a platable resin with which the groove is filled.

18 Claims, 10 Drawing Sheets

ELECTRONIC DEVICE INCLUDING REINFORCEMENT FORMED AT EDGE OF HOUSING AND WIRELESS COMMUNICATION APPARATUS INCLUDING REINFORCEMENT FORMED AT EDGE OF HOUSING

CROSS-REFERENCE TO RELATED APPLICATION

This application is based upon and claims the benefit of priority of the prior Japanese Patent Application No. 2015-150565, filed on Jul. 30, 2015, the entire contents of which are incorporated herein by reference.

FIELD

The embodiment discussed herein is related to an electronic device and a wireless communication apparatus.

BACKGROUND

Small electronic devices such as smart phones and wearable terminals are in widespread use.

The relate art is disclosed in Japanese Laid-open Patent Publication No. 2010-87022 or Japanese Laid-open Patent Publication No. 2000-278376.

SUMMARY

According to an aspect of the embodiments, an electronic device includes: a frame forming an edge portion of a plate-like housing; a groove defining a hollow, along an edge of the housing, in the frame; and a reinforcement disposed in the frame and made of a platable resin with which the groove is filled.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

It is desirable to improve the waterproof property and strength of housings for use in electronic devices because of, for example, downsizing of the electronic devices.

A material conforming to the application of an electronic device is used for the housing of the electronic device. For example, the housing of a portable electronic device for a user that is coated with a scratch-resistant hard resin is not easily scratched even though the user uses the electronic device on a daily basis. There may be a trade-off relationship between the hardness and flexibility of the material. For example, as the hardness of the resin for the housing is increased, the impact resistance of the housing may be reduced and the housing may easily break. For a housing with a low impact resistance, parts of the housing such as a housing surface and a pawl of an engagement portion may easily break due to an impact, for example, when the housing is dropped.

For example, to suppress breakage of a housing made of a hard resin due to an impact, the thickness of the resin housing may be increased. The resin housing with a larger thickness may cause a recess due to mold shrinkage, which is called a sink mark, to be formed on a surface of the housing. Accordingly, it may be difficult to make, out of a hard resin, a housing having sufficient strength to withstand an impact expected in daily use by a user without the surface of the housing becoming recessed by the sink mark. A thick portion of the housing, for example, may make it difficult to allow various conducting wires to pass therethrough compared with a thin portion of the housing or may occupy a space in which an antenna wire is laid.

Figure 1:
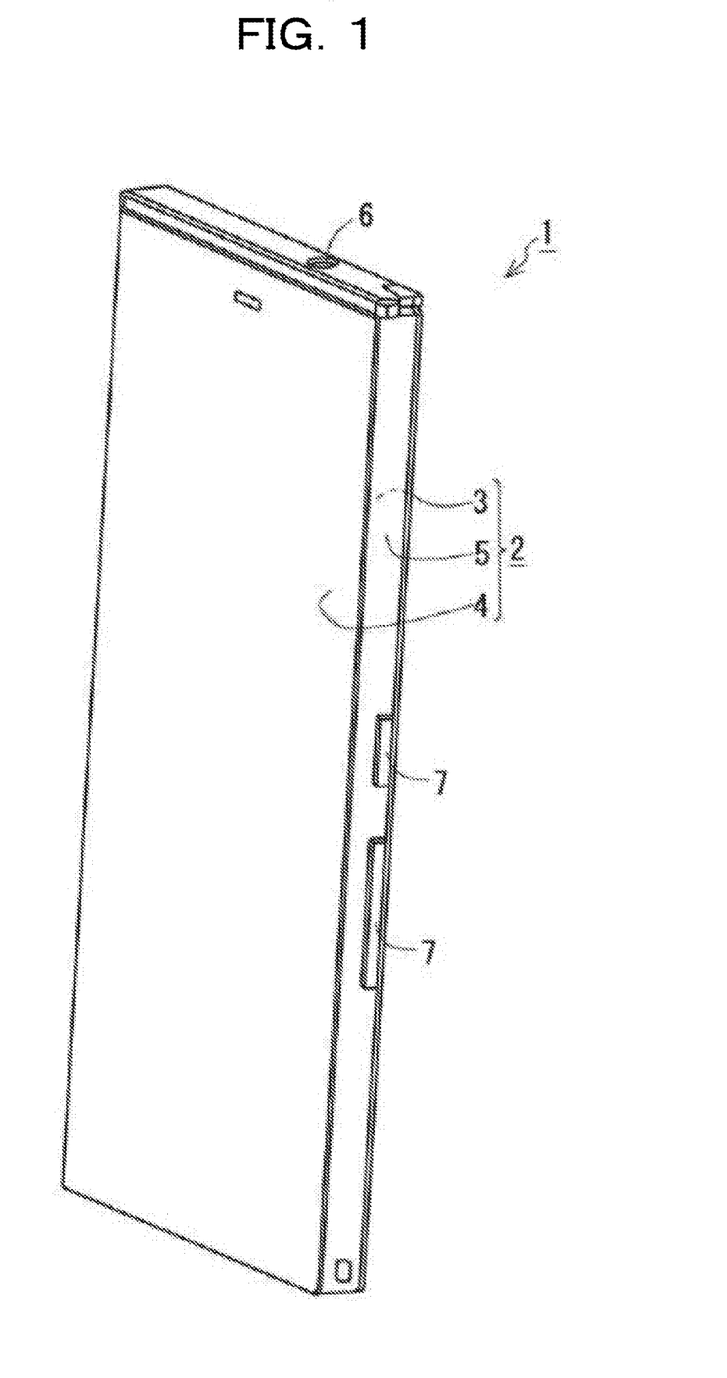
FIG. 1 illustrates an example of the appearance of a smart phone.

FIG. 1 illustrates an example of the appearance of a smart phone. A smart phone 1 is an electronic device that contains electronic components such as an electronic circuit and a battery and is a wireless communication apparatus that allows wireless communication with base stations that mobile phone operators or wireless carriers manage. As illustrated in FIG. 1, the smart phone 1 includes a plate-like housing 2. The smart phone 1 has a flat rectangular front surface 3 and a flat rectangular back surface 4 that are formed by the plate-like housing 2, and side surfaces 5 that are formed along the edges of the front surface 3 and the back surface 4. The housing 2 of the smart phone 1 includes a terminal 6, operation buttons 7, and other components.

Figure 2:
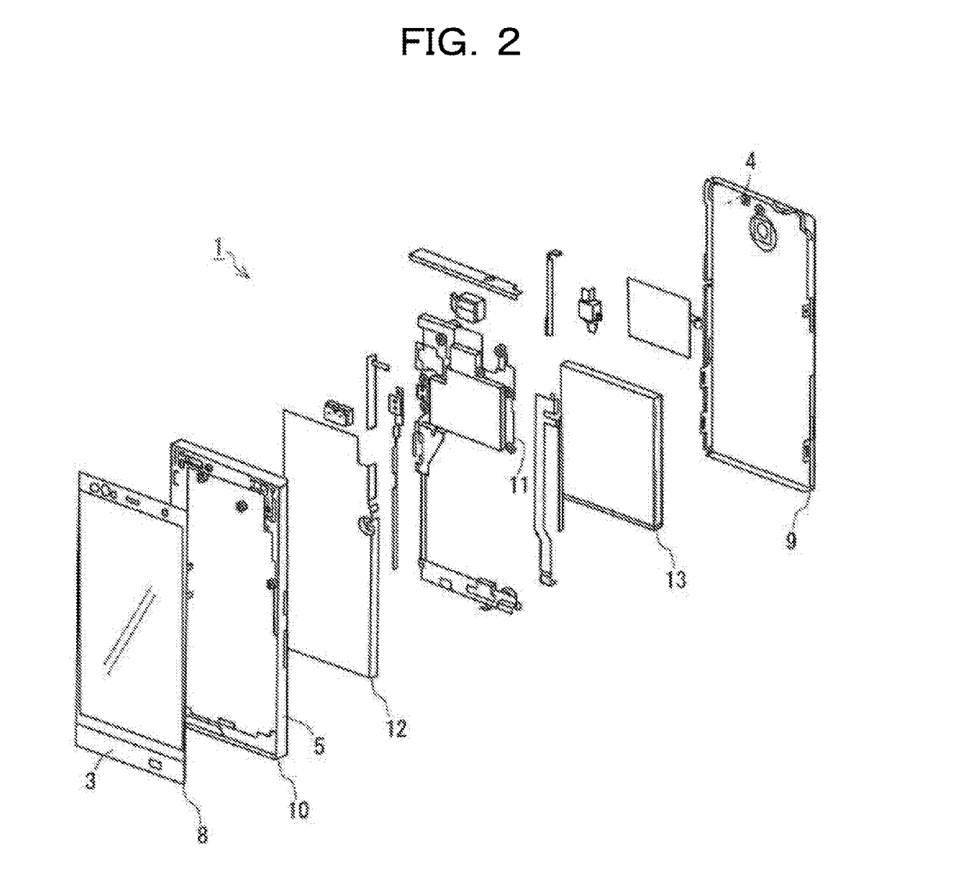
FIG. 2 illustrates an example of the internal structure of the smart phone.

FIG. 2 illustrates an example of the internal structure of the smart phone. The smart phone 1 includes various electronic components between a display module 8 forming the front surface 3 and an outer case 9 forming the back surface 4. For example, the smart phone 1 includes a frame-like inner case 10 forming the side surfaces 5, which are edge portions of the housing 2, a substrate 11, a shield 12 covering the substrate 11, and various electronic components such as a battery 13. The substrate 11, the shield 12, and the electronic components, such as the battery 13, are interposed between the display module 8 joined to the inner case 10 and the outer case 9 engaging with the inner case 10 within the frame-like inner case 10.

Figure 3:
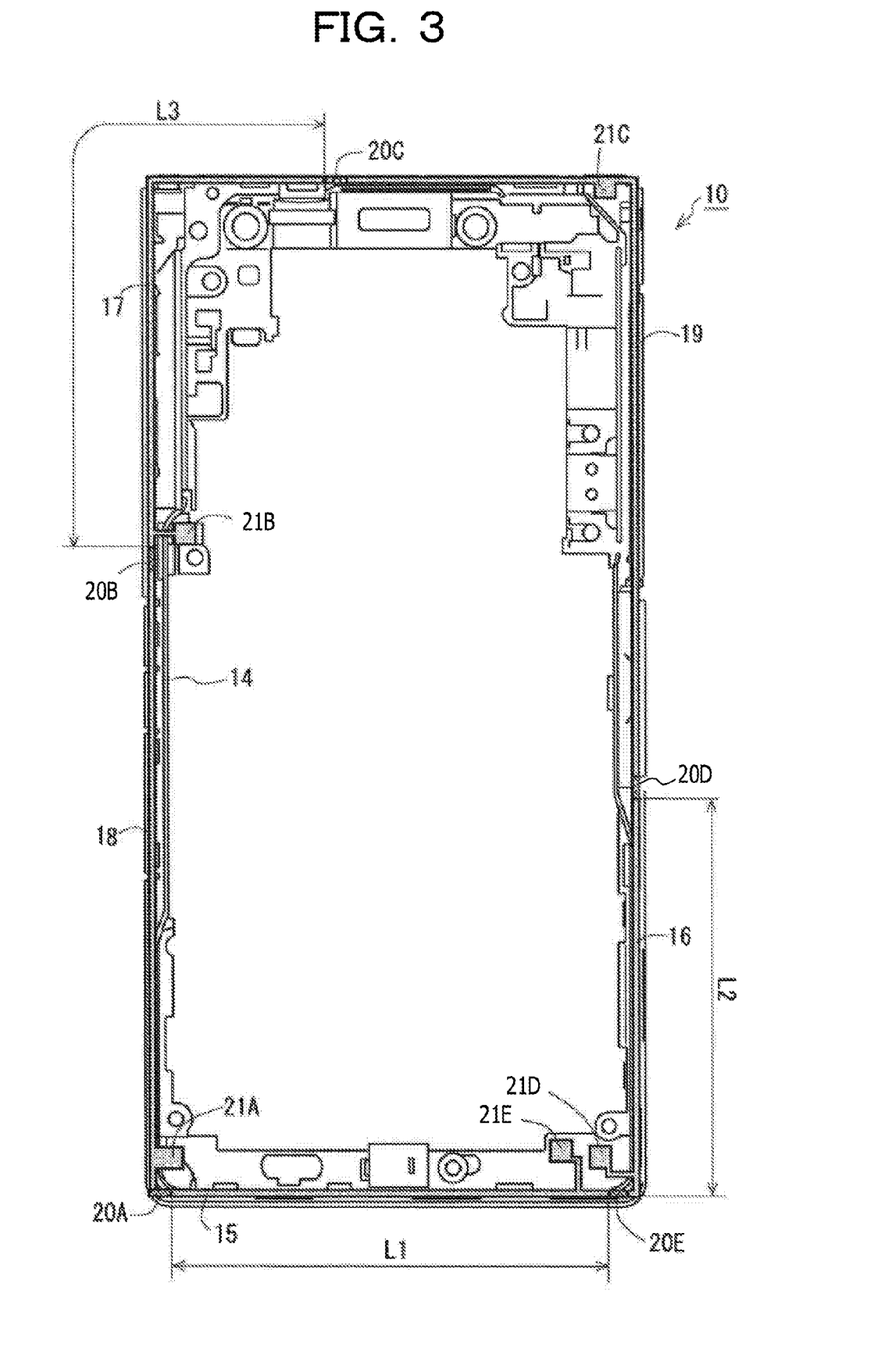
FIG. 3 illustrates an example of an inner case.

FIG. 3 illustrates an example of the inner case. The inner case 10 is a resin housing component forming a frame 14 along the edges of the housing 2 and has holes, grooves, and so on for securing the electronic components contained in the smart phone 1. The conducting wires are disposed on the frame 14 so as to extend along the edge portions of the housing 2. For example, a first antenna 15, a second antenna 16, a third antenna 17, a first spare wire 18, and a second spare wire 19 are disposed on the frame 14 so as to extend along the edge portions of the housing 2.

In FIG. 3 that illustrates the inner case 10 such that the longitudinal direction of the inner case 10 corresponds to the vertical direction of the page, the first antenna 15 is a conducting wire laterally extending along the lower side of the inner case 10. The first antenna 15 has a length represented by symbol L1 in FIG. 3. The length L1 of the first antenna 15 is determined appropriately in accordance with the wavelengths of radio waves that the first antenna 15 transmits and receives. In FIG. 3, the second antenna 16 is a conducting wire vertically extending along a lower portion of the right side of the inner case 10. The second antenna 16 has a length represented by symbol L2. The length L2 of the second antenna 16 may be determined appropriately in accordance with the wavelengths of radio waves that the second antenna 16 transmits and receives. The third antenna 17 is a conducting wire extending along a corner portion formed by an upper portion of the left side of the inner case 10 and a left portion of the upper side of the inner case 10. The third antenna 17 has a length represented by symbol L3. The length L3 of the third antenna 17 may be determined appropriately in accordance with the wavelengths of radio waves that the third antenna 17 transmits and receives. The first spare wire 18 is a conducting wire vertically extending along a lower portion of the left side of the inner case 10. The second spare wire 19 is a conducting wire extending along a corner portion formed by a right portion of the upper side of the inner case 10 and an upper portion of the right side of the inner case 10.

The inner case 10 includes ribs 20A to 20E that divide a conducting wire extending along the edge portions of the housing 2 into plural conducting wires such that the divided conducting wires extend at intervals along the edges of the housing 2. The rib 20A electrically separates the first antenna 15 from the first spare wire 18. The rib 20B electrically separates the first spare wire 18 from the third antenna 17. The rib 20C electrically separates the third antenna 17 from the second spare wire 19. The rib 20D electrically separates the second spare wire 19 from the second antenna 16. The rib 20E electrically separates the second antenna 16 from the first antenna 15.

The inner case 10 includes contacts 21A to 21E connected to the respective conducting wires extending at intervals along the edge portions of the housing 2. The contact 21A is a rectangular conductor disposed near the corner portion at the lower left of the inner case 10 and is electrically connected to the first spare wire 18 through an extension wire. The contact 21B is a rectangular conductor disposed near the central portion of the left side of the inner case 10 and is electrically connected to the third antenna 17 through an extension wire. The contact 21C is a rectangular conductor disposed near the corner portion at the upper right of the inner case 10 and is electrically connected to the second spare wire 19 through an extension wire. The contact 21D is a rectangular conductor disposed near the corner portion at the lower right of the inner case 10 and is electrically connected to the second antenna 16 through an extension wire. The contact 21E is a rectangular conductor disposed on the left side of the contact 21D and near the corner portion at the lower right of the inner case 10 and is electrically connected to the first antenna 15 through an extension wire.

Figure 4:
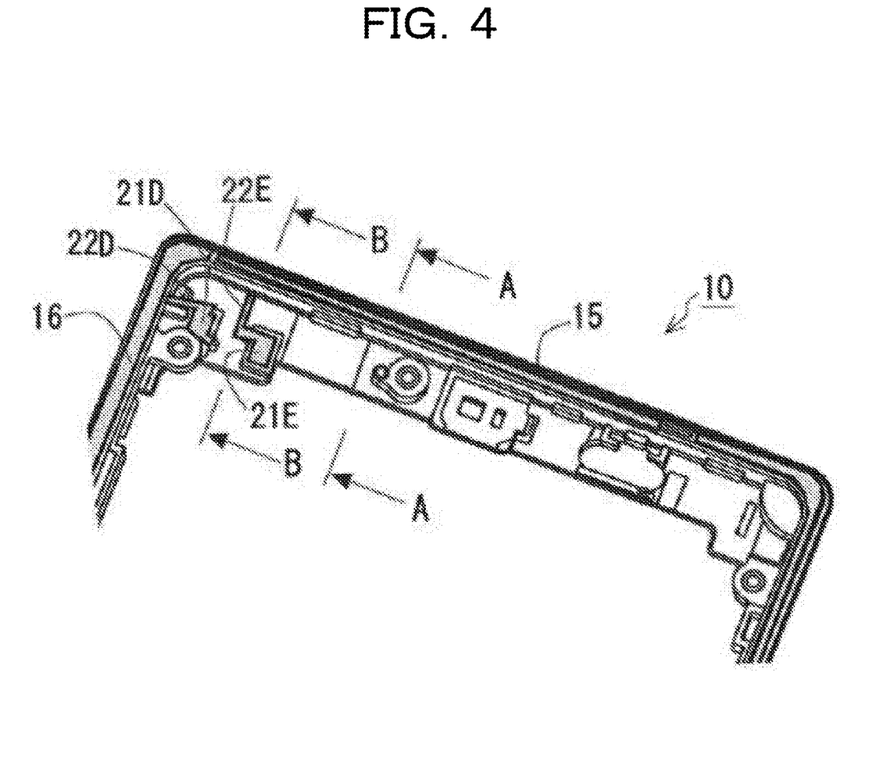
FIG. 4 illustrates an example of an enlarged view of the inner case near a first antenna.

FIG. 4 illustrates an example of an enlarged view of the inner case near the first antenna. The first antenna 15 is formed so as to extend along the edge of the housing 2. The contact 21E electrically connected to the first antenna 15 through an extension wire 22E is disposed near the first antenna 15. The contact 21D electrically connected to the second antenna 16 through an extension wire 22D is disposed next to the contact 21E.

Figure 5:
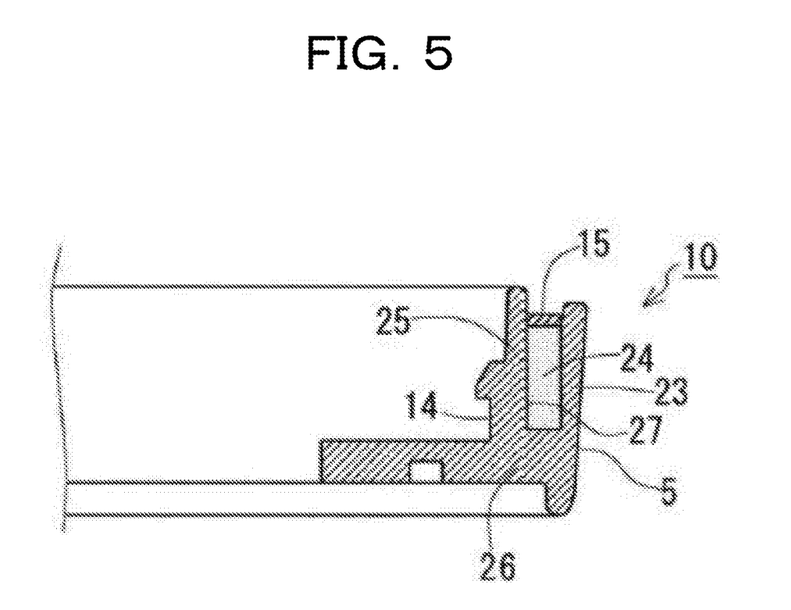
FIG. 5 illustrates an example of a sectional view of the inner case that is taken along line A-A depicted in FIG. 4.

FIG. 5 illustrates an example of a sectional view of the inner case 10 that is taken along line A-A depicted in FIG. 4. As illustrated in FIG. 5, the inner case 10 includes an outer sidewall 23 forming the side surfaces 5 of the housing 2 and an inner sidewall 25 formed inside the outer sidewall 23 with a reinforcement 24 therebetween. The outer sidewall 23 and the inner sidewall 25 vertically extend from a base 26 joined to the display module 8 along the edges of the display module 8 toward the side opposite the display module 8 and constitute the frame 14 with double structure that forms the side surfaces 5 of the housing 2. The outer sidewall 23 and the inner sidewall 25 vertically extend from the base 26, and a groove 27 that defines a hollow in the frame 14 is thus formed along the edges of the housing 2 assuming that the existence of the reinforcement 24 is disregarded. The formation of the groove 27 in the frame 14 causes the outer sidewall 23 forming the side surfaces 5 of the housing 2 to be thinned. The thinned outer sidewall 23 may reduce the occurrence of sink marks on the outer sidewall 23 when the inner case 10 is formed through molding. The reduction in the occurrence of sink marks on the outer sidewall 23 may reduce the occurrence of recesses on the side surfaces 5 due to the molding. The reduction in the occurrence of recesses on the side surfaces 5 may decrease the incidence of the inner case 10 that fails the visual inspection of the smart phone 1.

The first antenna 15, the second antenna 16, the third antenna 17, the first spare wire 18, and the second spare wire 19, which are conducting wires, are formed on an exposed portion of the reinforcement 24 exposed between the outer sidewall 23 and the inner sidewall 25. FIG. 5 illustrates a sectional view of, for example, the first antenna 15 that is taken along line A-A depicted in FIG. 4. The conducting wire such as the first antenna 15, which is formed on the exposed portion of the reinforcement 24 exposed between the outer sidewall 23 and the inner sidewall 25, may be made by plating the reinforcement 24.

The outer sidewall 23, the inner sidewall 25, and the base 26 that constitute the inner case 10 are made of a scratch-resistant hard material whose surface is not easily damaged by being touched by a user on a daily basis. Any one of various materials may be used as the hard material, whose surface is not easily damaged by being touched by a user on a daily basis. An example of the material is a polycarbonate resin (PC), which has good durability and is easy to mold.

The reinforcement 24 disposed in the groove 27 formed between the outer sidewall 23 and the inner sidewall 25 is made of a material that reinforces the thinned outer sidewall 23. The inner case 10 is manufactured through two-color molding (also referred to as double molding) by using a material of which the outer sidewall 23, the inner sidewall 25, and the base 26 are made and a material of which the reinforcement 24 is made in combination. Any one of various materials may be used as the material that reinforces the thinned outer sidewall 23. An example of the material is an ABS resin, which is known from experience to be less often damaged due to, for example, an impact when the smart phone is dropped, than a polycarbonate resin to which a large amount of glass filler (GF) is added although this depends on the amount of glass filler added. An ABS resin is suitable for reinforcing the outer sidewall 23. An ABS resin may be suitable for forming the conducting wires on the exposed portion of the reinforcement 24 because an ABS resin is platable. For example, the conducting wires may be formed on the exposed portion of the reinforcement 24 without using a laser direct structuring (LDS) technique, which may scatter the plating around the reinforcement 24. When the reinforcement 24 is made of an ABS resin, the conducting wires, such as the first antenna 15 or the other wires, may be formed by degreasing the reinforcement 24, chemically dissolving butadiene in the ABS resin for etching, performing processes such as catalyzing, and forming a metallic layer by, for example, electroplating. Polypropylene (PP) or polysulfone (PSF) may be used as a platable resin other than an ABS resin. Any one of various platable resins other than an ABS resin may be used for the reinforcement 24, for example, provided that sufficient strength of the thinned outer sidewall 23 is ensured.

In the smart phone 1 in which the side surfaces 5 of the housing 2 are formed by the inner case 10 having the above structure, the outer sidewall 23 is reinforced by the reinforcement 24. Accordingly, even when the outer sidewall 23, which forms the side surfaces 5 that a user touches on a daily basis, is made of a scratch-resistant hard material such as a polycarbonate resin so as to be thin, the outer sidewall 23 may withstand an impact on the smart phone 1, for example, when the smart phone 1 is dropped.

With the inner case 10 having the above structure, the antennas (first antenna 15, second antenna 16, and third antenna 17) used for transmitting and receiving radio waves are embedded in the component of the housing 2. Accordingly, the antennas may be more readily formed than when a space available for the antennas is provided inside the housing 2.

A conducting wire 28 formed in the inner case 10 may be used as an antenna but may not be used as an antenna. The conducting wire 28 formed in the inner case 10 may be put to various uses such as a terminal used for electrical charging and a terminal to be electrically connected to a cradle. The electronic device may be the smart phone 1 but may not be a smart phone. The electronic device may be a portable electronic device such as an electronic dictionary or a wearable device, or another electronic device containing a housing.

Figure 6:
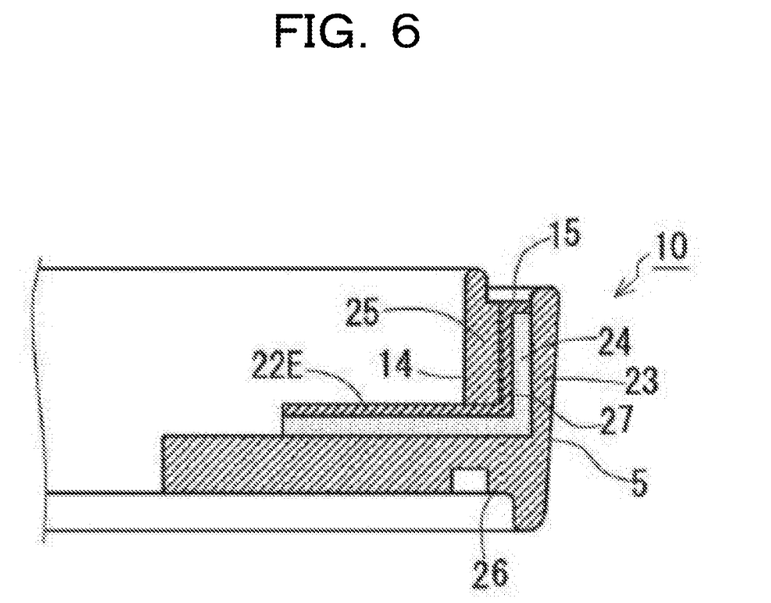
FIG. 6 illustrates an example of a sectional view of the inner case that is taken along line B-B depicted in FIG. 4.

FIG. 6 illustrates an example of a sectional view of the inner case 10 that is taken along line B-B depicted in FIG. 4. The line B-B depicted in FIG. 4 traverses the inner case 10 in the longitudinal direction of the extension wire 22E. FIG. 6 illustrates not only the section of the first antenna 15 but also the section of the extension wire 22E. The conducting wire disposed on the reinforcement 24 between the outer sidewall 23 and the inner sidewall 25 may be electrically connected to an electronic component such as the substrate 11 through an extension wire formed, for example, in the following manner.

The conducting wire disposed on the reinforcement 24 between the outer sidewall 23 and the inner sidewall 25 may be electrically connected to an electronic component such as the substrate 11, for example, through the contact 21E disposed at an end of the extension wire 22E extending between the inner sidewall 25 and the reinforcement 24 and extending from the lower portion of the groove 27 toward the inside of the inner case 10 as illustrated in FIG. 6. A space in which the extension wire 22E is formed is provided, for example, by using a protruding part that is formed on a mold used for the two-color molding and that leaves a hollow at a position at which the extension wire 22E is to be formed. In addition to the extension wire 22E that connects the first antenna 15 with the contact 21E, the extension wire that connects the second antenna 16 with the contact 21D and the other extension wires may be formed in the same manner as the extension wire 22E.

Each of the conducting wires disposed on the reinforcement 24 is not limited to a conducting wire electrically connected to an electronic component through an extension wire extending between the inner sidewall 25 and the reinforcement 24 and extending from the lower portion of the groove 27 toward the inside of the inner case 10, such as in the case of the extension wire 22E. Each of the conducting wires disposed on the reinforcement 24 may be electrically connected to an electronic component, for example, through an extension wire extending across the top of the inner sidewall 25 toward the inside of the inner case 10 or through an extension wire following another route.

In the smart phone 1, the groove 27 is located in a portion to which the outer case 9 forming the back surface 4 of the housing 2 is attached. The groove 27 is covered by the outer case 9 and is not exposed to the outside of the smart phone 1. The groove 27 may be located, for example, on the side to which the display module 8 forming the front surface 3 of the housing 2 is attached. The groove 27 is covered by the display module 8 and is not exposed to the outside of the smart phone 1 even when the groove 27 is located in a portion to which the display module 8 forming the front surface 3 of the housing 2 is attached.

Figure 7A:
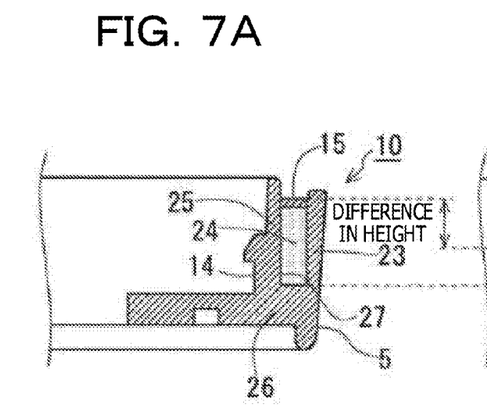
FIG. 7A and FIG. 7B illustrate examples of enlarged views of the inner case near the first antenna.
Figure 7B:
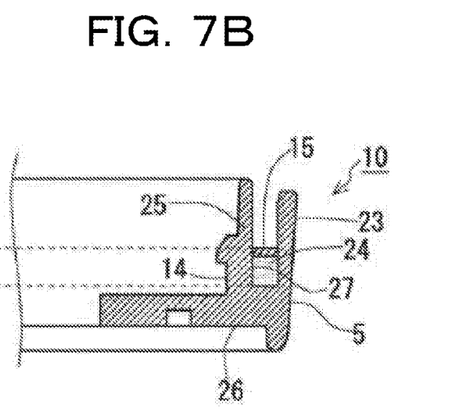

FIG. 7A and FIG. 7B illustrate examples of enlarged views of the inner case near the first antenna. In FIG. 7A and FIG. 7B, the conducting wire 28 disposed on the reinforcement 24 may be located at an appropriate depth in the groove 27. The conducting wire 28 disposed on the reinforcement 24 may be located, for example, near an upper portion in the groove 27 as illustrated in FIG. 7A or near a middle portion in the groove 27 as illustrated in FIG. 7B. The depth at which the conducting wire 28 is located in the groove 27 may depend on the height of the reinforcement 24 formed in the groove 27. For example, when the height of the reinforcement 24 formed in the groove 27 is low, the conducting wire 28 is formed near a middle portion or a lower portion in the groove 27; when the height of the reinforcement 24 formed in the groove 27 is high, the conducting wire 28 is formed near an upper portion in the groove 27.

Figure 8:
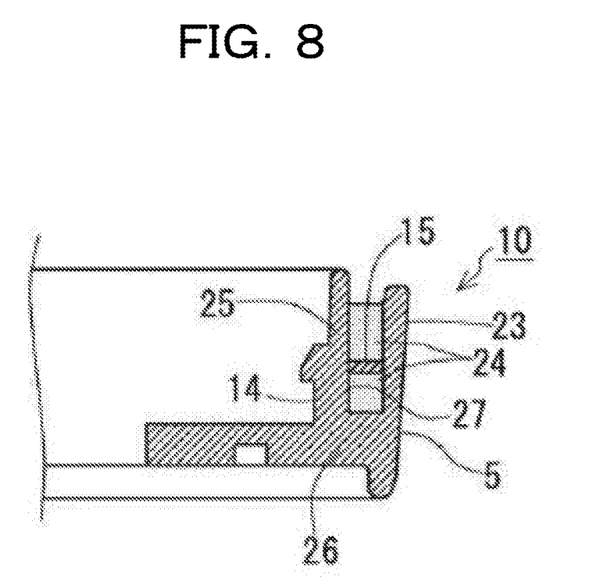
FIG. 8 illustrates an example of an enlarged view of the inner case near the first antenna.

FIG. 8 illustrates an example of an enlarged view of the inner case near the first antenna. In FIG. 8, the conducting wire 28 may be embedded in the reinforcement 24. For example, as illustrated in FIG. 8, the conducting wire 28 disposed on the reinforcement 24 may be embedded in the reinforcement 24 in a manner in which the exposed portion of the reinforcement 24 formed so as to nearly reach the middle portion in the groove 27 is plated and an upper space above the conducting wire 28 is filled with the material of which the reinforcement 24 is made.

Figure 9:
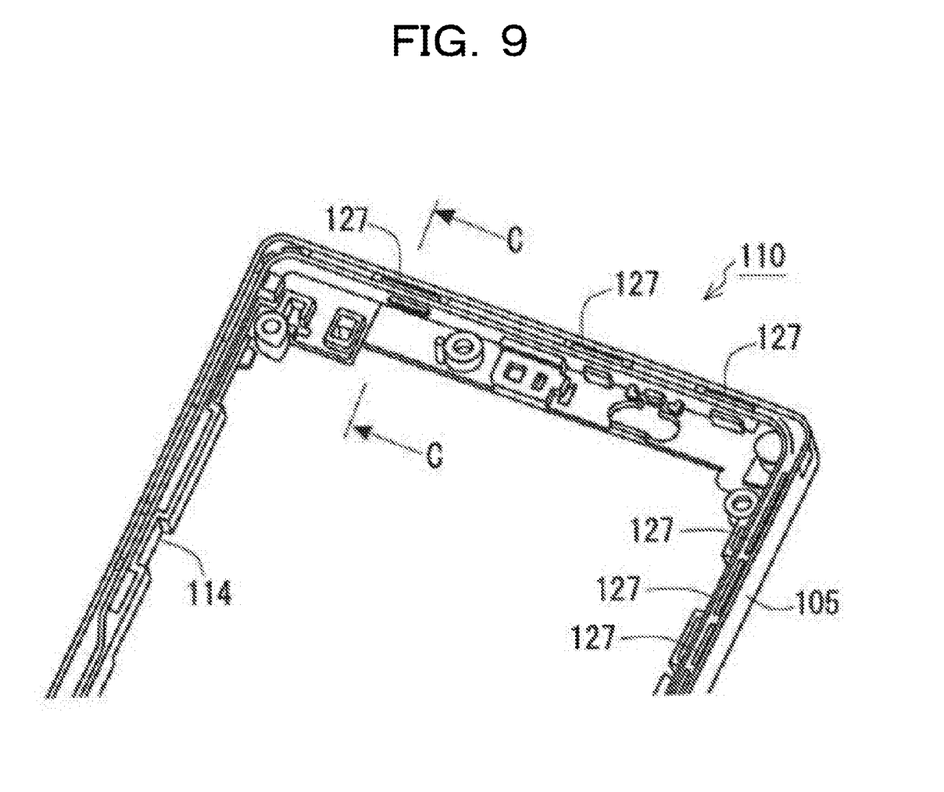
FIG. 9 illustrates an example of an enlarged view of part of the inner case.

FIG. 9 illustrates an example of an enlarged view of part of an inner case. An inner case 110 illustrated in FIG. 9 does not include the conducting wire 28 unlike the inner case 10. The inner case 110 includes long and narrow grooves 127 that extend and are arranged at intervals along the edges of a smart phone in which side surfaces 105 of a housing are formed by a frame 114 of the inner case 110. The grooves 127 may be formed to inhibit the side surfaces 105 from being recessed due to sink marks occurring when the inner case 110 is molded with a resin.

Figure 10:
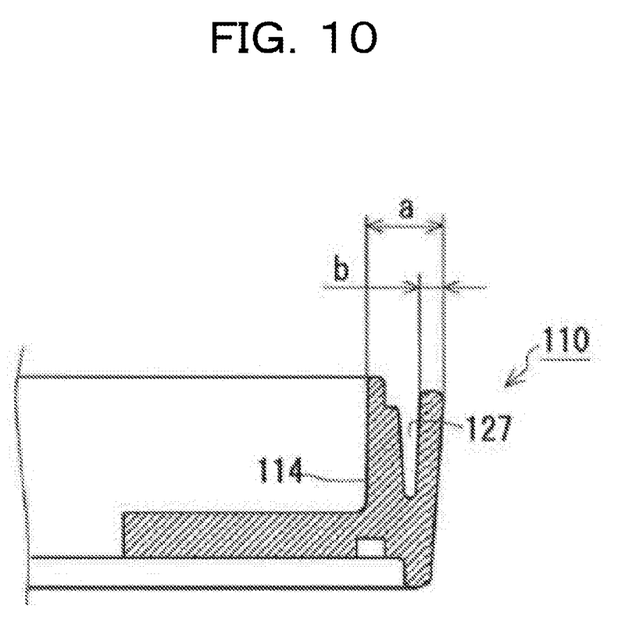
FIG. 10 illustrates an example of a sectional view of the inner case that is taken along line C-C depicted in FIG. 9.

FIG. 10 illustrates an example of a sectional view of the inner case 110 that is taken along line C-C depicted in FIG. 9. When the thickness of the frame 114 is increased to increase the impact resistance of the inner case 110, a recess due to mold shrinkage, which is called the sink mark, may occur on a surface of the housing. For example, in the inner case 110 as illustrated in FIG. 10, the groove 127 may define a hollow in the frame 114 forming the side surfaces 105 of the housing of the smart phone. When the inner case 110 is formed through molding with a mold that enables the hollow to be defined in the frame 114 by the groove 127, the occurrence of recesses on the side surfaces 105 due to sink marks after molding is reduced. When the hollow is defined in the frame 114 by the groove 127, the thickness of a portion of the frame 114 that contributes to the strength thereof against an impact may not be the thickness a illustrated in FIG. 10 but may be the thickness b smaller than the thickness a. In the inner case 10, a space corresponding to the groove 127 is filled with the reinforcement 24. Accordingly, the thickness of a portion of the frame 14 that contributes to the strength thereof against an impact may be a thickness corresponding to the thickness a illustrated in FIG. 10. With the inner case 10, a housing having sufficient strength to withstand an impact expected in daily use by a user may be made of a rigid and hard resin and a recess due to a sink mark may not occur on the side surfaces 5.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An electronic device comprising:
   a frame forming an edge portion of a plate-like housing;
   a groove defining a hollow, along an edge of the housing, in the frame; and
   a reinforcement disposed in the frame and made of a platable resin with which the groove is filled.

2. The electronic device according to claim 1,
   wherein the groove is formed in a portion of the frame to which a housing component forming a front surface or a back surface of the plate-like housing is attached, and
   wherein the reinforcement is covered by the housing component attached to the frame.

3. The electronic device according to claim 1,
   wherein the frame is made of a resin that is harder than the resin of which the reinforcement is made.

4. The electronic device according to claim 1, further comprising:
   a conducting wire extending along the edge of the housing and made by plating an exposed portion of the reinforcement that is exposed in an opening of the groove.

5. The electronic device according to claim 4,
   wherein the conducting wire is disposed discontinuously along the edge of the housing.

6. The electronic device according to claim 4,
   wherein the groove is divided into plural grooves by ribs arranged along the edge of the housing, and
   wherein the conducting wire is divided into plural conducting wires by the ribs.

7. An electronic device comprising:
   a plate-like housing; and
   a conductor disposed at a periphery of the plate-like housing,
   wherein a sidewall of the plate-like housing includes:
     an outer sidewall located on an outer side of the plate-like housing;
     an inner sidewall located on an inner side of the plate-like housing; and
     a reinforcement formed by filling a groove formed between the outer sidewall and the inner sidewall.

8. The electronic device according to claim 7,
   wherein the plate-like housing includes a frame at an edge portion
   wherein the groove is formed in a portion of the frame to which a housing component forming a front surface or a back surface of the plate-like housing is attached, and
   wherein the reinforcement is covered by the plate-like housing component attached to the frame.

9. The electronic device according to claim 7,
   wherein the plate-like housing includes a frame at an edge portion and the groove is formed in a portion of the frame,
   wherein the frame is made of a resin that is harder than the resin of which the reinforcement is made.

10. The electronic device according to claim 7, further comprising:
    a conducting wire extending along the edge of the housing and made by plating an exposed portion of the reinforcement that is exposed in an opening of the groove.

11. The electronic device according to claim 10,
    wherein the conducting wire is disposed discontinuously along the edge of the housing.

12. The electronic device according to claim 10,
    wherein the groove is divided into plural grooves by ribs arranged along the edge of the housing, and
    wherein the conducting wire is divided into plural conducting wires by the ribs.

13. A wireless communication apparatus comprising:
    a plate-like housing;
    a frame forming an edge portion of the housing;
    a groove defining a hollow, along an edge of the housing, in the frame;
    a reinforcement disposed in the frame and made of a platable resin with which the groove is filled; and
    an antenna disposed on a surface of the reinforcement.

14. The wireless communication apparatus according to claim 13,
    wherein the groove is formed in a portion of the frame to which a housing component forming a front surface or a back surface of the plate-like housing is attached, and
    wherein the reinforcement is covered by the housing component attached to the frame.

15. The wireless communication apparatus according to claim 13,
    wherein the frame is made of a resin that is harder than the resin of which the reinforcement is made.

16. The wireless communication apparatus according to claim 13, further comprising:
    a conducting wire extending along the edge of the housing and made by plating an exposed portion of the reinforcement that is exposed in an opening of the groove.

17. The wireless communication apparatus according to claim 16,
    wherein the conducting wire is disposed discontinuously along the edge of the housing.

18. The wireless communication apparatus according to claim 16,
    wherein the groove is divided into plural grooves by ribs arranged along the edge of the housing, and wherein the conducting wire is divided into plural conducting wires by the ribs.

\* \* \* \* \*